United States Patent
Cho

(10) Patent No.: US 7,183,965 B2
(45) Date of Patent: Feb. 27, 2007

(54) EFFICIENT STRIPMAP SAR PROCESSING FOR THE IMPLEMENTATION OF AUTOFOCUS AND MISSING PULSE RESTORATION

(75) Inventor: Kwang M. Cho, Los Angeles, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 11/294,084

(22) Filed: Dec. 5, 2005

(65) Prior Publication Data

US 2006/0109165 A1     May 25, 2006

Related U.S. Application Data

(63) Continuation-in-part of application No. 10/996,246, filed on Nov. 23, 2004, and a continuation-in-part of application No. 11/200,836, filed on Aug. 10, 2005.

(51) Int. Cl.
*G01S 13/90* (2006.01)

(52) U.S. Cl. ................. 342/25 R; 342/25 D; 342/25 F; 342/140; 342/196

(58) Field of Classification Search ............... 342/25 R, 342/25 D, 25 F, 140, 161, 90, 192, 194, 196
See application file for complete search history.

(56) References Cited

U.S. PATENT DOCUMENTS 5,248,976 A * 9/1993 Niho et al. ................ 342/25 A
6,018,306 A * 1/2000 Serbin ........................ 342/25 A
6,492,932 B1 * 12/2002 Jin et al. .................. 342/25 R
6,781,541 B1 * 8/2004 Cho ............................ 342/25 D
7,006,031 B1 * 2/2006 Abatzoglou et al. ....... 342/25 A
2003/0142000 A1 * 7/2003 Cho ............................ 342/25

* cited by examiner

*Primary Examiner*—Thomas H. Tarcza
*Assistant Examiner*—Isam Alsomiri
(74) *Attorney, Agent, or Firm*—Leonard A. Alkov; Karl A. Vick

(57) ABSTRACT

A moving radar generates a search mode synthetic aperture image of a patch from a sequence of periodic pulse returns having one or more missing pulses. An azimuth and range interpolation generates an interpolated sequence having samples oriented in range and azimuth frequency with uniform spacing. Range compression is performed using an IFFT. Azimuth deskew, an autofocus and pulse restore generates a focused and restored sequence. Azimuth reskew, and gain phase equalization generates an equalized sequence. A first linear phase is summed to the equalized sequence for applying a fractional sample shift in range frequency. A range FFT and Along Track IFFT is further applied to obtain a domain changed sequence. A second linear phase is summed to the domain changed sequence. A CT FFT of the result generates an image of the patch. The azimuth interpolation and range interpolation also include a Stolt interpolation after a matched filter function.

10 Claims, 7 Drawing Sheets

EFFICIENT STRIPMAP SAR PROCESSING FOR THE IMPLEMENTATION OF AUTOFOCUS AND MISSING PULSE RESTORATION

This application is a continuation in part of U.S. Patent and Trademark Office application Ser. No. 10,996,246, titled Autofocus Method Based on Successive Parameter Adjustments for Contrast Optimization, filed Nov. 23, 2004, (PD-03W148), and Ser. No. 11/200,836 titled Efficient Autofocused Method for Swath SAR filed Aug. 10, 2005 (PD-04W210).

This invention was made with Government support under Contract No. F19628-00-C-0100 awarded by the Department of the Air Force. The Government has certain rights in this invention.

BACKGROUND OF THE INVENTION

1. Field of the Invention

This invention is in the field of autofocus methods for search (swath) Synthetic Aperture Radar (SAR) imaging where missing pulses are encountered.

2. Description of the Related Art

Synthetic Aperture Radar (SAR) is used for ground mapping as well as target identification. The general principle behind SAR is to coherently combine the amplitude and phase information of radar returns from a continuous sequence of transmitted pulses. These transmitted pulses are from a relatively small antenna on a moving platform. As the platform moves, the information reflected from the sequence of pulses is coherently combined to arrive at a high resolution SAR image.

The plurality of sequential returns creating a SAR image generated by the transmitted pulses along a presumed known path of the platform make up an array. Theoretically, during the array, amplitude as well as phase information returned from each of the pulses, for each of many range bins, is preserved. The SAR image is formed from the coherent combination of the amplitude and phase of return(s) within each range bin, motion compensated for spatial displacement of the moving platform during the acquisition of the returns for the duration of the array.

The clarity of a SAR image is in many respects dependent on the quality of the motion compensation applied to each radar return prior to SAR image computation. Motion compensation shifts the phase of each radar sample (typically an I+jQ complex quantity derived from an analog to digital converter) in accordance with the motion in space of the moving platform with respect to a reference point. The SAR imaging process depends on the coherent, phase accurate summing of the sequence of all radar returns expected within an array.

For certain applications the accuracy of the motion compensation derived phase compensation applied to each radar A/D sample is insufficiently accurate. For better phase alignment accuracy autofocus (AF) methods are used. Autofocus (AF) methods typically use information contained in the radar returns of the SAR data itself in an attempt to phase align radar return samples to accuracies better than those available from motion compensation alone. Estimated phase error derived from collected SAR data is applied to the motion compensated SAR data to improve the resulting SAR image. This SAR data driven approach for phase error estimation and compensation is generally referred to as autofocus (AF).

In addition to the spotlight mode, SAR radar can also be operated in the search (swath or strip) map mode. Spotlight mode produces two dimensional images of limited size of a limited area by steering the antenna beam to the center of the map (image) center for the duration of a frame (or array). Conversely, search mode produces image strips of theoretically unlimited length by maintaining a fixed azimuth antenna orientation during a SAR data collection period, or array. Unlike spotlight mode that typically produces images oriented in the range-azimuth direction, search mode produces images oriented in the along track and cross track direction. Uncompensated platform motion during search mode results in image smearing in the azimuth direction caused by pulse data that affects azimuth response. Because target image smears in the direction of both image axes, it is difficult to estimate and correct residual phase error for autofocus using one dimensional batch processing.

Another difficulty presented during search mode comes from incomplete arrays. That is, a number of radar pulse returns forming the sequence of returns in an array may be missing. The missing pulses within an array blur the resulting SAR image, obfuscating details thus rendering it of limited utility, necessitating restoration of the missing pulse returns. However, restoration of missing pulses is complicated by the need to orient the data in the Range and Azimuth direction, presenting a large computational load on the on-board processor.

SUMMARY OF THE INVENTION

Above limitations are reduced and search mode SAR images are improved by a radar for generating a search mode synthetic aperture image of a patch from a sequence of periodic pulse returns reflected from the patch. The sequence of periodic pulse returns have one or more missing pulses. The radar is moving along a path, at a range from the patch. The path is positioned at an azimuth angle from the patch. The radar comprises an analog to digital converter for converting the pulse returns from the patch into a digital stream. The digital stream is descriptive of the pulse returns as a function of range and azimuth angle.

A computer receives the digital stream and computes:

an azimuth interpolation and range interpolation for generating an interpolated sequence having samples oriented in range and azimuth frequency with uniform spacing;

a range compression of the interpolated sequence of periodic pulse returns to obtain a compressed sequence typically using an IFFT;

an azimuth deskew of the compressed sequence to obtain a deskewed sequence;

an autofocus and pulse restore of the deskew sequence to obtain a focused (and restored) sequence;

an azimuth reskew of the focused sequence to obtain a reskewed sequence;

a gain phase equalization of the reskewed sequence to obtain an equalized sequence;

a summing of a first linear phase for applying a fractional sample shift in range frequency to the equalized sequence to obtain a shifted sequence;

a range FFT and Along Track IFFT of the shifted sequence to obtain a domain changed sequence;

a summing of a second linear phase to said domain changed sequence;

a CT FFT of the domain changed sequence plus the second linear phase yields an image of said patch.

The azimuth interpolation and range interpolation also include a Stolt interpolation after a matched filter function.

The image of the patch is further processed using spatially variant apodization. Preferably, the compressed sequence is converted to a matrix and transposed.

DETAILED DESCRIPTION OF THE INVENTION

The present invention describes a method for improving search type SAR images of a patch where missing pulses within an array are restored using information contained in the incomplete array.

1) Introduction

SAR images require a complete array of reflected pulse returns, each of the returns from the reflected pulses accurately phase aligned, to achieve the in-phase combination of the information contained therein. Phase errors arise from navigation data inaccuracies from motion compensation, or from atmospheric effects on radar returns causing de-focusing of SAR images. The methods used to compensate for these type of errors, is called auto-focus (AF). AF depends on information contained in motion compensated radar collected data to perform relatively fine, accurate phase correction not originally provided by motion compensation.

Figure 1:
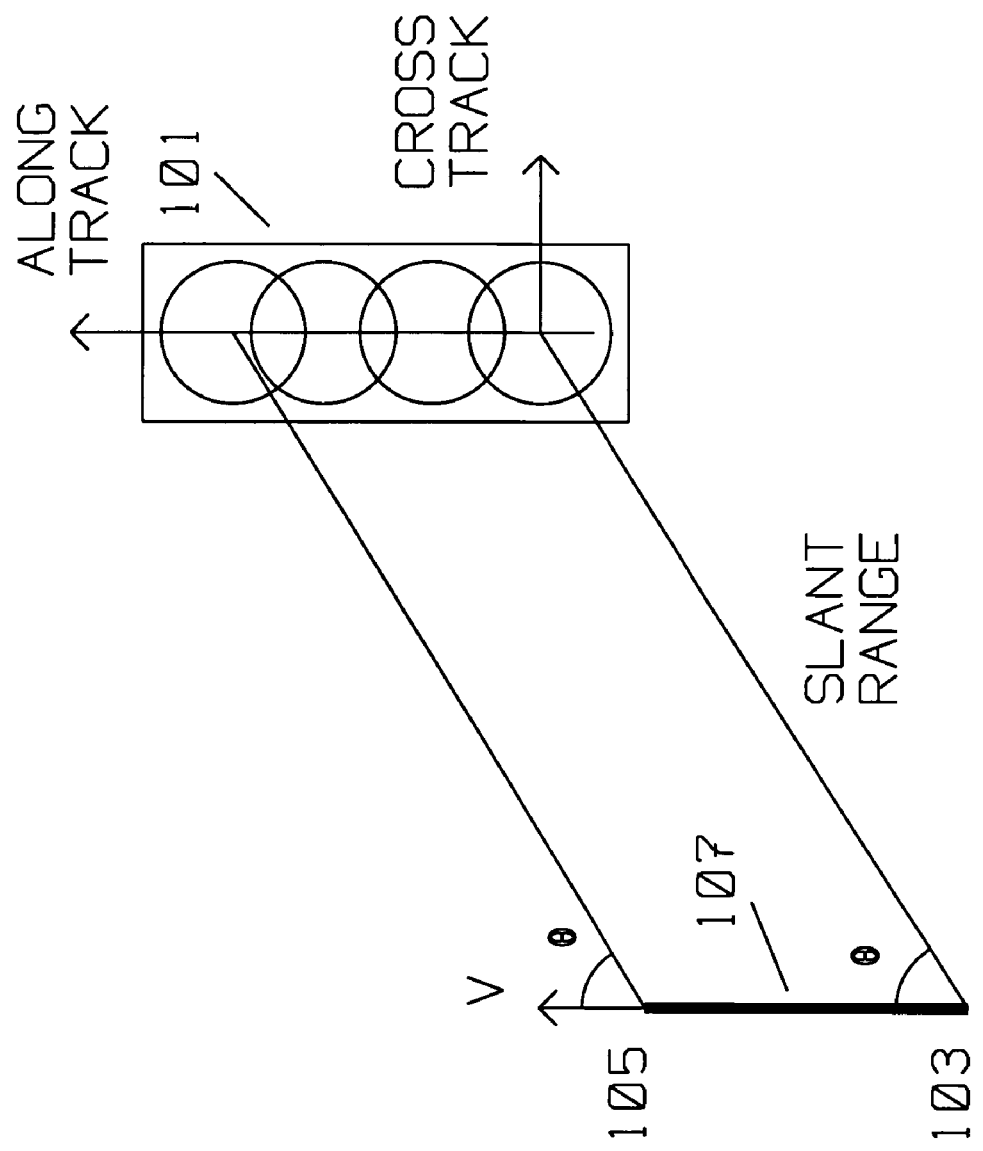
FIG. 1 is a SAR swath configuration of the prior art.

Unlike the case in spot SAR mode, images generated in search mode are preferably oriented in the along-track, cross track direction, unlike range and azimuth typical of spot mode. FIG. 1 shows the typical prior art geometric relationship between a moving platform carrying a radar transmitter/receiver using Synthetic Aperture (SAR) search methods imaging patch 101 by said radar transmitter/receiver. The moving platform is initially at position 103, travels along a rectilinear path 107 with velocity V to position 105. In SAR search (or swath) mode applicable in this description, the SAR antenna azimuth is fixed at azimuth angle θ oriented towards patch 101 as the platform moves with velocity V. The moving platform moves from position 103 to position 105 along path 107, while maintaining a fixed angle θ with respect to the path 107 so that the antenna illuminates portions of patch 101 as it progresses. Radar pulses are transmitted and corresponding returns received at many points during the arrays collected between position 103 and position 105. The search types of SAR radar are well known in the art and are described, for example, by J. C. Curlander, et al, in *Synthetic Aperture Radar: Systems and Processing*, Wiley, 1991, incorporated herein be reference in its entirety.

Motion compensation is the process of digital correction of radar phase error for each radar return in a SAR frame forming a SAR image due to the change in position of scatterers relative to the moving platform as it acquires radar returns. The motion of the moving platform with respect to a focus point is typically measured using accelerometers coupled to GPS/INS systems. Motion compensation is performed in an airborne digital computer (processor) 702 shown in FIG. 7, on each I/Q sample of a radar return. The exact form of motion compensation depends on the method used to compile the SAR image from the radar returns. Residual phase error is the phase error present after motion compensation has been taken into account. Residual phase error from various sources, such as uncompensated sensor motion or atmospheric effects, results in degraded SAR image quality.

In some applications the sequence of reflected radar pulse returns making up an array is interrupted, thus the sequence expected within an array is incomplete. This is typical where multiple modes share pulse return collection time in one receiver. In this disclosure, missing pulses are restored using extrapolation techniques such as the linear prediction method. The effect of missing pulses is most marked in the azimuth direction and affects the autofocus function. Thus, the interpolated sample grids in the spatial frequency domain are oriented in range and azimuth.

2) Conversion of Sample Grids Orientation

SAR search mode is different from spotlight mode. Spotlight mode generally produces images oriented in the range and azimuth direction. In search mode, the image is in the along track and cross track direction. Imperfections in motion compensation will smear the resulting image in both axes. Thus, smearing is the result of two sources of errors, one corresponding to each axis. Because of error contribution from both axes, it is difficult to estimate and correct the residual, post motion compensation errors using one dimensional processing.

Search mode phase error can be estimated and corrected in the batch processing stage of image formation. That is, pulse to pulse processing is done as the data is acquired and the autofocus is implemented at a later time. An example of autofocus processing is described in U.S. Pat. No. 6,781,541, issued Aug. 24, 2004, incorporated herein by reference in its entirety. Compared with the '541 patent, the present method and apparatus is computationally more efficient in estimating and correcting phase errors while relatively simpler to implement.

Figure 2:
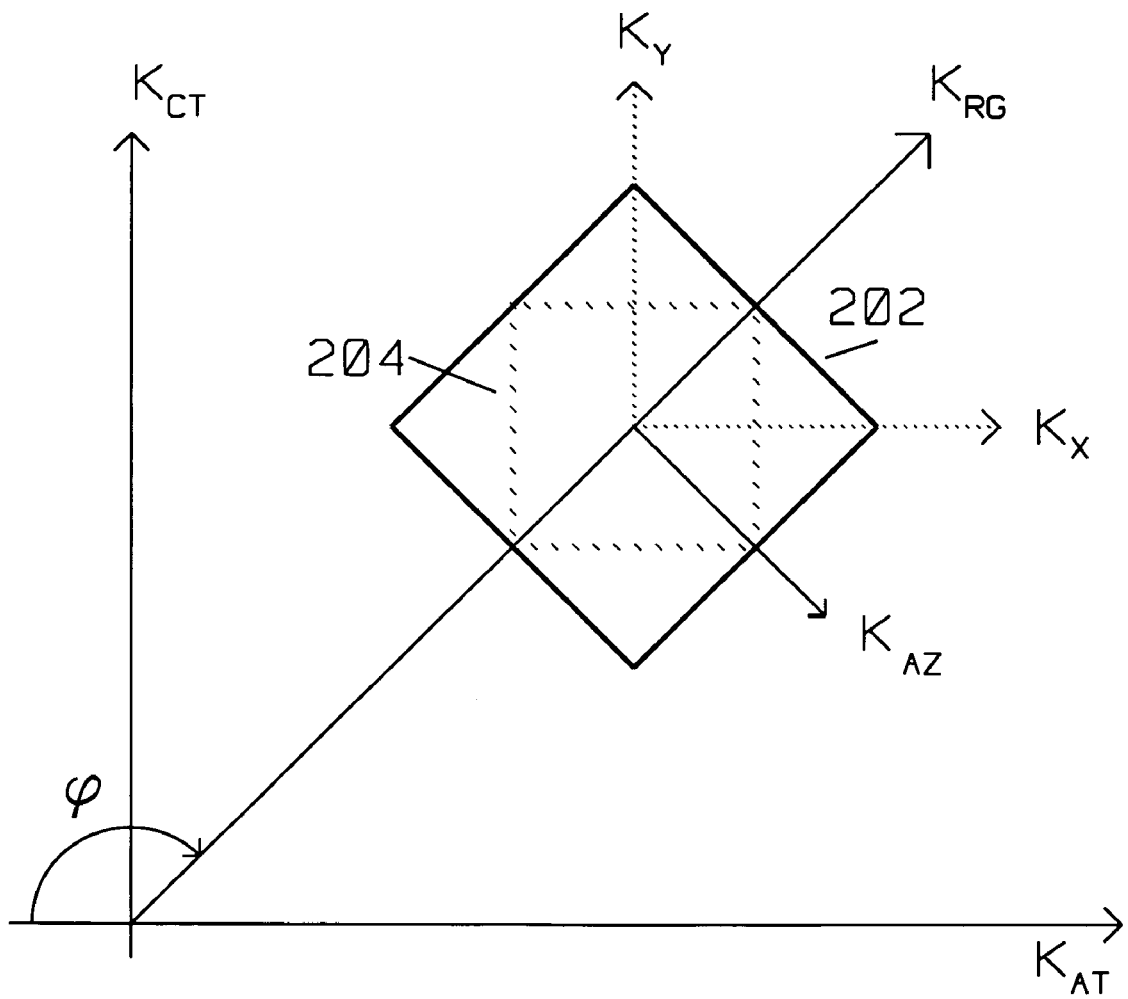
FIG. 2 shows a preferred embodiment for sampled data orientation for autofocus and data restoration 202 and final stage image formation 204.

A Stolt interpolator produces spatial frequency data oriented in range and azimuth for the application of batch autofocus and missing pulse restoration. Subsequent to the Stolt interpolator, radar data orientation is converted to CT (Cross Track)—AT (Along Track) direction. As shown in FIG. 2, solid box 202 indicates data orientation prior to to the application of these functions, while dotted box 204 indicates the orientation of resampled data in the rotated axes after autofocus and missing pulse restoration.

The re-sampling process is performed in two stages. The first stage is for the conversion from the range frequency samples to the Cross track (CT) frequency samples. Using the sampled data obtained in the first stage, the second stage performs resampling to get AT (Along Track) frequency sample on each CT grid.

For this disclosure, sample data parameters in the spatial frequency domain are defined as follows:

$K_{RG}$, $K_{AZ}$, $K_X$, $K_Y$ are frequency variables in Range, Azimuth, Along track (AT) and Cross track (CT) respectively;

$DK_{RG}$, $DK_{AZ}$, $DK_X$, $DK_Y$ are the data length in Range, Azimuth, AT and CT respectively;

$\Delta K_{RG}$, $\Delta K_{AZ}$, $\Delta K_X$, $\Delta K_Y$ are the frequency sample spacing in Range, Azimuth, AT, and CT respectively; and $N_{KRG}$, $N_{KAZ}$ are the number of range and azimuth frequency samples to be taken for resampling.

Parameters in range-azimuth and CT-AT coordinate systems are related as follows:

$$DK_{RG} = DK_Y |\sin\varphi| + DK_X |\cos\varphi|$$

$$DK_{AZ} = DK_Y |\cos\varphi| + DK_X |\sin\varphi|$$

$$\Delta K_{RG} = \frac{\Delta K_Y}{|\sin\varphi|}$$

$$\Delta K_{AZ} = \frac{\Delta K_X}{|\sin\varphi|}$$

$$N_{KRG} = \left\lceil \frac{DK_{RG}}{\Delta K_{RG}} \right\rceil$$

$$N_{KAZ} = \left\lceil \frac{DK_{AZ}}{\Delta K_{AZ}} \right\rceil$$

where $\lceil A \rceil$ indicates the least integer greater or equal to A.

2.1 Resampling in Range Frequency and Azimuth Frequency Grids

Figure 3:
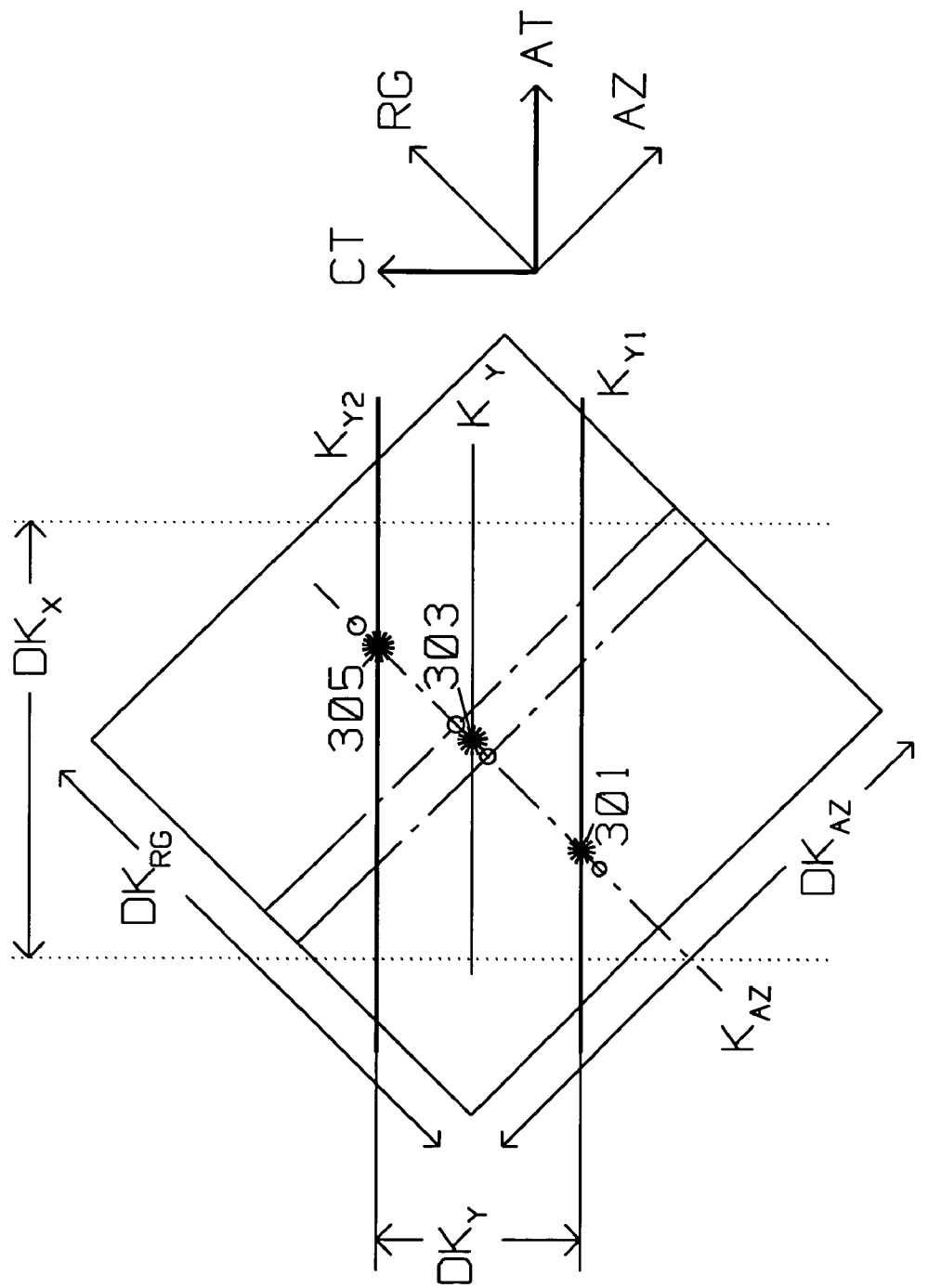
FIG. 3 shows a first resampling stage where ($K_{AZ}$, $K_{RG}$) is converted to ($K_{AZ}$, $K_Y$)
Figure 4:
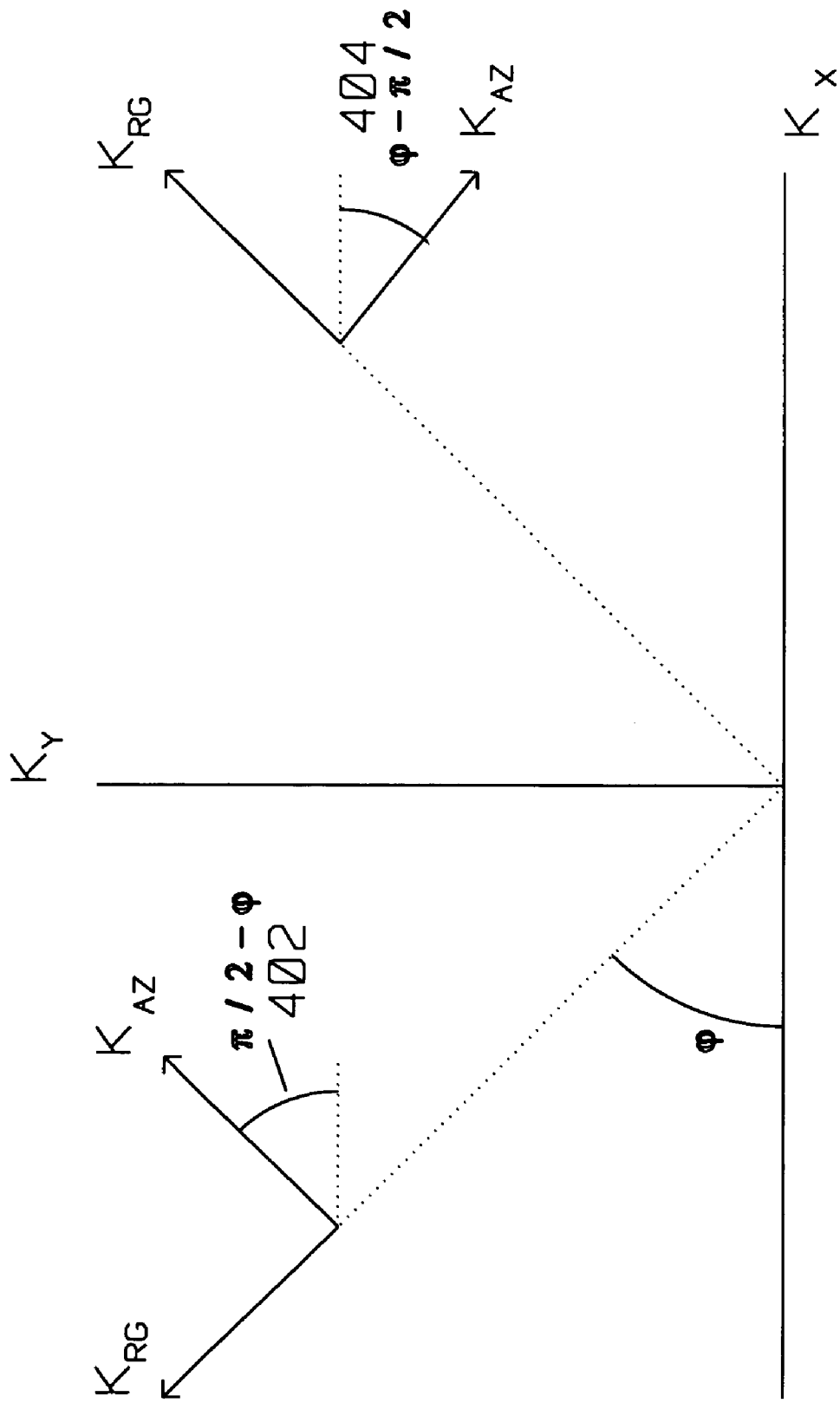
FIG. 4 shows a coordinate system for this disclosure.

The first resampling stage is illustrated in FIG. 3. It takes range frequency samples on each azimuth grid. Required fractional sample shift is also calculated, as shown at bold circle output 301, 303 and 305. Typical inputs are the empty circles. Two end samples in range frequency on each azimuth frequency grid is obtained from the CT frequency bounds. Coordinate transform is performed for the rotation of coordinate systems depicted in FIG. 4, as shown at 402 and 404.

$K_{AZ}$ is obtained from the coordinate transform with rotation $$K_{AZ} = K_X \sin\phi + K_Y \cos\phi$$

and from $$K_X = \frac{K_{AZ} - K_Y \cos\varphi}{\sin\varphi}$$

Similarly, $K_{RG}$ is obtained with the substitution for $K_X$ from:

$$K_{RG}(K_{AZ}, K_Y) = -K_X \cos\varphi + K_Y \sin\varphi$$
$$= -\cot\varphi(K_{AZ} - K_Y \cos\varphi) + K_Y \sin\varphi$$
$$= -K_{AZ}\cot\varphi + K_Y \csc\varphi$$

$F_{KRG}$, the fractional sample shift required to get samples at the desired CT grids is calculated using the steps of:

a) Obtain the data bounds in range frequency that is equal to the minimum and maximum range frequency values or that determined by the CT frequency bounds. Range frequency bounds determined by the CT frequency bounds are:

$$\hat{K}_{RG1}(K_{AZ}) = -K_{AZ}\cot\varphi + \frac{K_Y(0)}{\sin\varphi}$$

$$\hat{K}_{RG2}(K_{AZ}) = -K_{AZ}\cot\varphi + \frac{K_Y(N_Y - 1)}{\sin\varphi}$$

The first and the last input range frequency values are:

$$K_{RG1}(K_{AZ}) = \max(\lfloor \hat{K}_{RG1}(K_{AZ}), K_{RG}(0) \rfloor)$$

$$K_{RG2}(K_{AZ}) = \min(\lceil \hat{K}_{RG2}(K_{AZ}), K_{RG}(N_{KRG}-1) \rceil)$$

where the symbols $\lfloor$ and $\rfloor$ are used to indicate the floor function and the symbols $\lceil$ and $\rceil$ are used to indicate the ceiling function.

The required fractional shift in range frequency is $$F_{KRG}(K_{AZ}) = \frac{K_{RG1}(K_{AZ})}{\Delta K_{RG}} - \left\lfloor \frac{K_{RG1}(K_{AZ})}{\Delta K_{RG}} \right\rfloor$$

Figure 5:
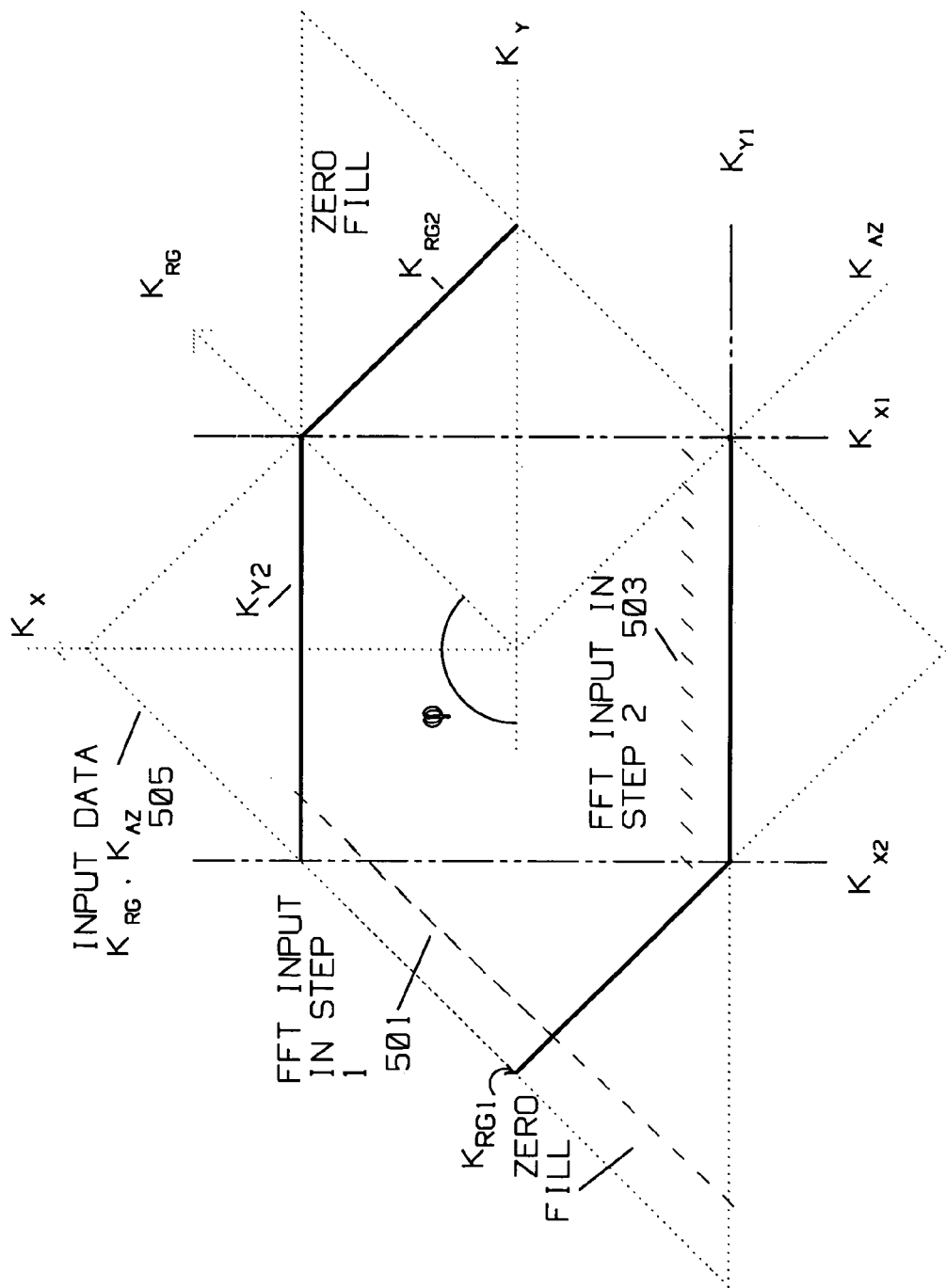
FIG. 5 shows data boundaries and input data length for two resampling steps, output bounded by ($K_{X1}$, $K_{X2}$) and ($K_{Y1}$, $K_{Y2}$)

Data bounded by $K_{RG1}$ and $K_{RG2}$ described in section 2.1 is indicated in FIG. 5. Input data 505 is $K_{RG}$, $K_{AZ}$. The relationship of the (first) FFT INPUT 501 to step 1 is shown, along with FFT INPUT 503 in step 2.

As shown below, this fractional shift in azimuth frequency is done equivalently by applying linear phase in azimuth spatial domain. Zeros padded to the data in range frequency $K_{RG}$ are shown in FIG. 5.

The linear phase to be applied to the data in spatial azimuth for the FFT length $NFFT_{KRG}$ is:

$$\Phi_{RG} = 2\pi \frac{k \cdot F_{KRG}(K_{AZ})}{NFFT_{KRG}}$$

where $$k = -\frac{NFFT_{KRG}-1}{2}, -\frac{NFFT_{KRG}-1}{2}-1, \ldots \frac{NFFT_{KRG}-1}{2}$$

Section 2.2—Second Resampling

Figure 6:
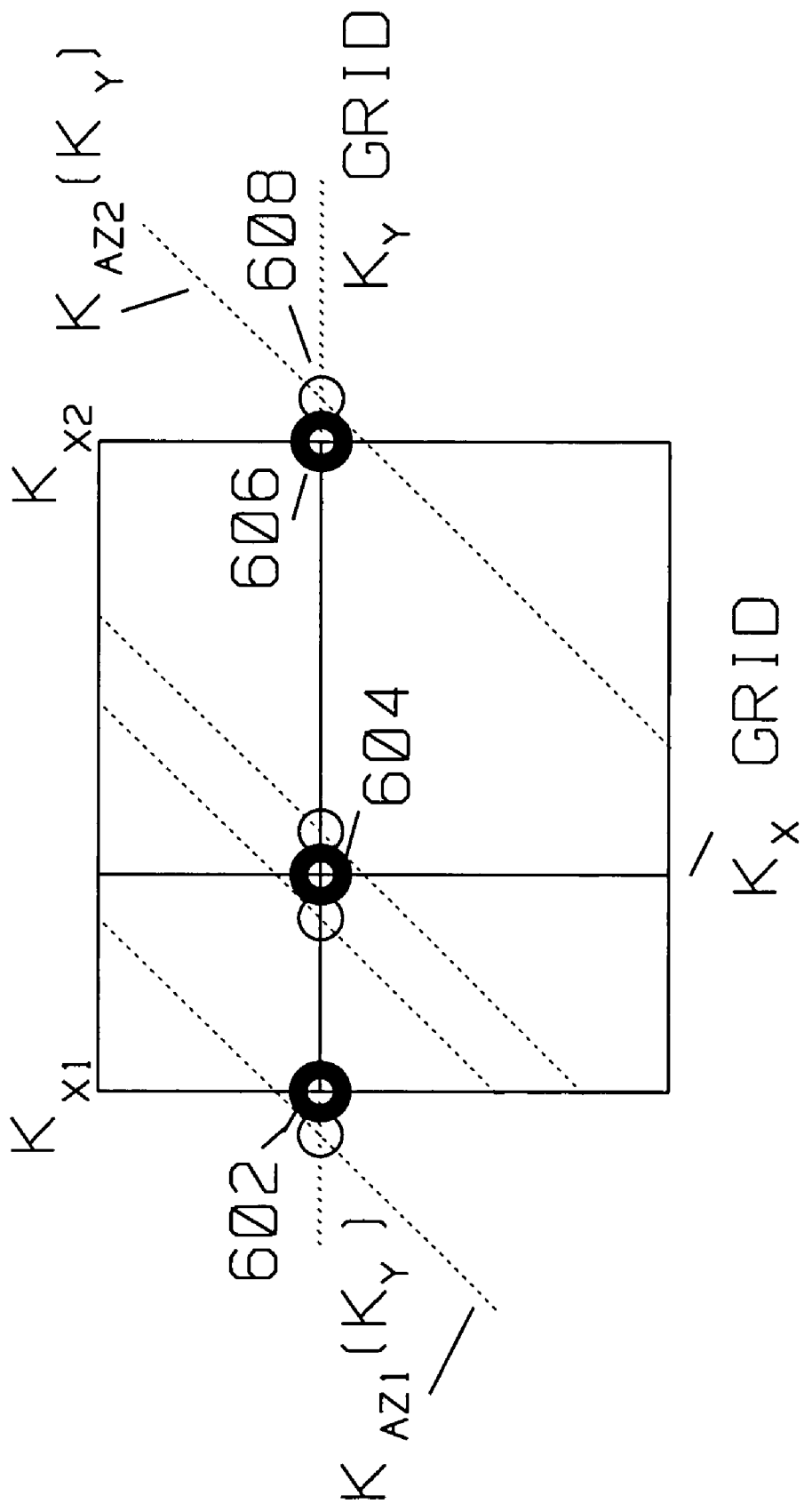
FIG. 6 shows resampling in AT frequency on each CT frequency grid.

The resampling process performed in section 2.1 positions the range frequency data sampled on the desired AT grids. The second resampling stage is shown in fig 6. In FIG. 6, resampling in AT frequency on each CT frequency grid is shown. The inputs, for example empty circle 608, are converted to outputs, for example the bold circles 602, 604 and 606. In FIG. 6, quantities in the ($K_Y$, $K_{AZ}$) coordinate are converted to the ($K_Y$, $K_X$) coordinate.

Similarly to the previous step, location of the first sample point to compute and the fractional shift is calculated. The first AT sample to be taken on CT grids is:

$$K_{X1}(K_Y) = \left\lfloor \left( \frac{DK_Y}{2} + sgn\left(\frac{\pi}{2} - \varphi\right) \cdot \frac{DK_Y}{2} - k \cdot \Delta K_Y \right) \cot\varphi \right\rfloor$$

where $sgn(A) = 1$ for $A \geq 0$ and $sgn(A) = -1$ for $A < 0$

The fractional shift in AT frequency is calculated from:

$$F_{KX}(K_Y) = \frac{K_{XI}(K_{CT})}{\Delta K_X} - \left\lfloor \frac{K_{XI}(K_Y)}{\Delta K_X} \right\rfloor$$

The linear phase to be applied to the data in spatial azimuth for the FFT length $\text{NFFT}_{KX}$ is:

$$\Phi_X = 2\pi \frac{k \cdot F_{KX}(K_Y)}{\text{NFFT}_{KX}}$$

where $$k = -\frac{\text{NFFT}_{KX}-1}{2}, -\frac{\text{NFFT}_{KX}-1}{2}-1, \ldots \frac{\text{NFFT}_{KX}-1}{2}$$

Figure 7:
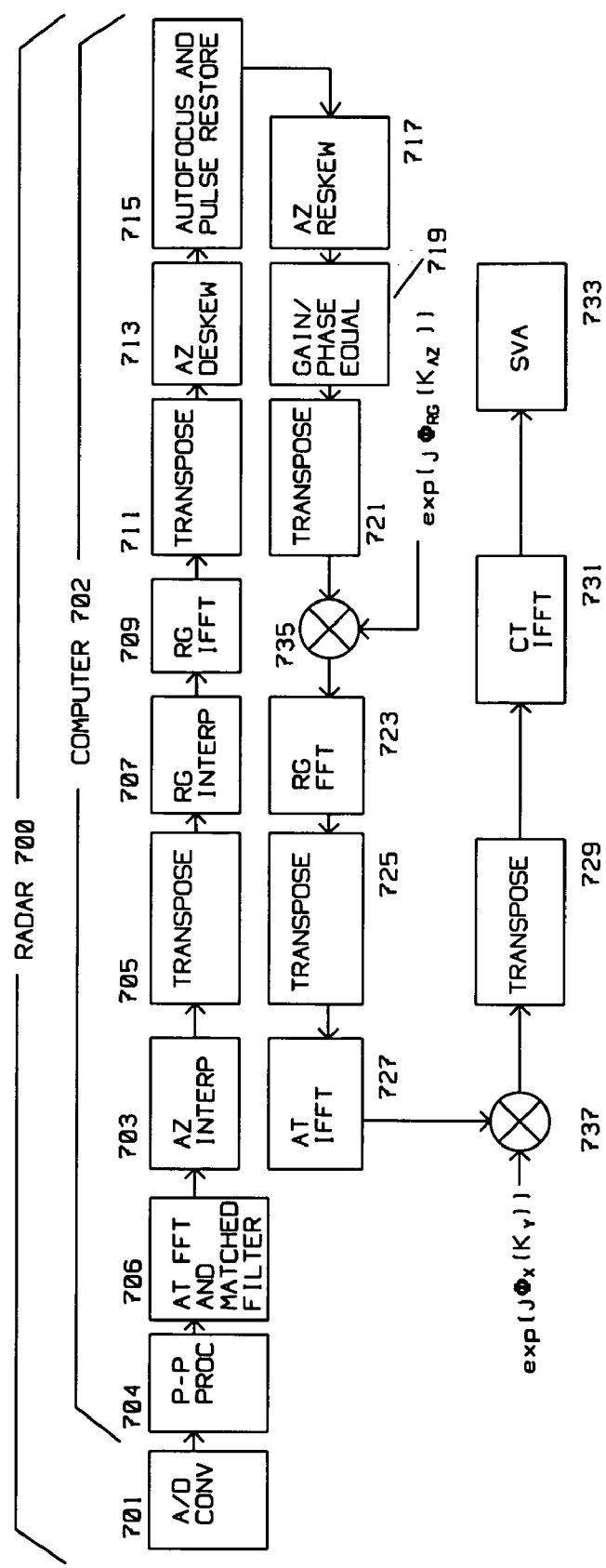
FIG. 7 shows the steps performed to obtain a SAR image in accordance with this disclosure.

As described above, a fractional sample shift in spatial frequency is achieved by applying linear phase in the spatial domain. The sequence of processing functions to achieve this with a minimal number of steps is shown in FIG. 7.

Analog to Digital converter 701, within radar 700, converts radar returns reflected from a radar energy illuminated area of interest into digital form, generating I+jQ values for each range bin. The digital I+jQ values are digitally processed by Computer 702.

P—P processing 704 processed range samples on a pulse by pulse basis to convert the collected range samples in time to sample in range frequency. Motion compensation is also performed at this stage. AT FFT and Matched filter function 706 convert pulses to azimuth spatial frequency and perform proper gain and phase adjustment to arrive at the desired phase expression.

Radar 700 is used for generating a search mode synthetic aperture image of a patch 101 (FIG. 1) from a sequence of periodic pulse returns reflected from patch 101. The sequence of periodic pulse returns has one or more missing pulses. Radar 700 has a motion along a path 107 in FIG. 1. The radar motion is at a (slant) range R from patch 101. Path 107 is positioned at an azimuth angle ($\theta$) from patch 101. Radar 700 comprises an analog to digital converter 701 for converting the pulse returns from patch 101 into a digital stream. The digital stream is descriptive of the pulse returns as a function of range R and said azimuth angle $\theta$.

Further comprised within Radar 700 is a computer 702 for computing the following operations.

1) An azimuth interpolation 703 and range interpolation 707 for generating an interpolated sequence having samples oriented in range and azimuth frequency with uniform spacing.

This generates spatial frequency samples along grids oriented in range and azimuth frequency with desired uniform spacing. This function includes Stolt interpolation after a matched filter function in RMA (Range Migration Algorithm) processing. The digital stream is organized in matrix format, and a matrix transpose 705 facilitates the computation for proper data sequence. The result of this step is $K_{AZ}$, $K_{RG}$.

2) A range compression 709 of the interpolated sequence of periodic pulse returns to obtain a compressed sequence. An IFFT (Inverse Fourier Transform) is used for range compression. Transpose 711 facilitates computation.

3) Azimuth deskew 713 of said compressed sequence to obtain a deskewed sequence. Azimuth deskew is for the alignment of azimuth frequency in time. The result is RG, $K_{AZ}$. This enables autofocus and pulse restoration 715 to obtain a focused sequence. This is in accordance with, and described in U.S. Pat. No. 6,670,907 to K. M. Cho, incorporated herein by reference in its entirety.

4) Azimuth reskew 717 of said focused sequence computes a reskewed sequence.

5) A gain phase equalization 719 of said reskewed sequence is computed to obtain an equalized sequence. Transpose 721 operates on the equalized sequence to facilitate further computations.

6) Summing of a first linear phase, in summer 735, applies a fractional sample shift in range frequency to said equalized sequence to obtain a shifted sequence. The first linear phase $e^{(j\Phi - RG(K_{AZ}))}$ is computed from:

$$\Phi_{RG}(K_{AZ}) = 2\pi \cdot F_{KRG}(K_{AZ}) \cdot RG$$

This linear phase is applied to range bin data after Gain/Equalization 719 and Transpose 721 to compute the shifted sequence (the fractional sample shift in range frequency), now defined in dimensions of ($K_{AZ}$, RG).

7) Range FFT 723 for converting to range spacial frequency. After Transpose 725, samples are taken for the desired aperture length in CT frequency, starting with the first sample $K_{RG1}(K_{AZ})$, as described in section 2.1 supra.

8) AT (Along Track) IFFT 727 converts the shifted sequence after processing by Range FFT 723 and transpose 725 to obtain a domain changed sequence. The domain changed sequence is in the ($K_Y$, X) domain.

9) Summer 737 adds a second linear phase to the domain changed sequence emerging from AT IFFT 727. The second linear phase is computed from $e^{(j\Phi_X(K_Y))}$ where $$\Phi_X(K_Y) = 2\pi \cdot F_{KX}(K_Y) \cdot X$$

10) Transpose 729 and CT FFT 731 convert the domain changed sequence to the (X,Y) domain obtain an image of the imaged patch.

11) The image of the patch is further processed, if desired, using SVA (Spatially Variant Apodization) 733.

All references cited in this document are incorporated herein in their entirety by reference.

Although presented in exemplary fashion employing specific embodiments, the disclosed structures are not intended to be so limited. For example, although the optimization herein is described in the context of a radar system, it is also applicable for sonar, or similar imaging methods, where an image of scatterers is extracted from coherent summing of a plurality of phase accurate returns where one or more pulses are missing.

Those skilled in the art will also appreciate that numerous changes and modifications could be made to the embodiment described herein without departing in any way from the invention.

The invention claimed is:

1. A radar generates a search mode synthetic aperture image of a patch from a sequence of periodic pulse returns reflected from said patch, said radar having a motion along a path, said motion at a range from said patch, said path positioned at an azimuth angle from said patch, said radar comprising:
   an analog to digital converter for converting said pulse returns from said patch into a digital stream, said digital stream descriptive of said pulse returns as a function of said range and said azimuth angle;
   a computer for computing:
   an azimuth interpolation and range interpolation for generating an interpolated sequence having samples oriented in range and azimuth frequency with uniform spacing;

a range compression of said interpolated sequence of periodic pulse returns to obtain a compressed sequence;

an azimuth deskew of said compressed sequence to obtain a deskewed sequence;

an autofocus and pulse restore of said deskew sequence to obtain a focused sequence;

an azimuth reskew of said focused sequence to obtain a reskewed sequence;

a gain phase equalization of said reskewed sequence to obtain an equalized sequence;

a summing of a first linear phase for applying a fractional sample shift in range frequency to said equalized sequence to obtain a shifted sequence;

a range FFT and Along Track IFFT of said shifted sequence to obtain a domain changed sequence;

a summing of a second linear phase to said domain changed sequence;

a CT FFT of said domain changed sequence to obtain an image of said patch.

2. A radar system as described in claim 1 wherein said azimuth interpolation and said range interpolation also include a Stolt interpolation after a matched filter function.

3. A radar system as described in claim 2 wherein said range compression is performed using an inverse Fast Fourier Transform.

4. A radar system as described in claim 3 wherein said image of said patch is further processed using spatially variant apodization.

5. A radar system as described in claim 4 wherein said compressed sequence is converted to a matrix and transposed.

6. A method for operating a radar for generating a search mode synthetic aperture image of a patch from a sequence of periodic pulse returns reflected from said patch, said radar having a motion along a path, said motion at a range from said patch, said path positioned at an azimuth angle from said patch, said method comprising the steps of:

converting said pulse returns from said patch into a digital stream, said digital stream descriptive of said pulse returns as a function of said range and said azimuth angle;

computing:

an azimuth interpolation and range interpolation for generating an interpolated sequence having samples oriented in range and azimuth frequency with uniform spacing;

a range compression of said interpolated sequence of periodic pulse returns to obtain a compressed sequence;

an azimuth deskew of said compressed sequence to obtain a deskewed sequence;

an autofocus and pulse restore of said deskew sequence to obtain a focused sequence;

an azimuth reskew of said focused sequence to obtain a reskewed sequence;

a gain phase equalization of said reskewed sequence to obtain an equalized sequence;

a summing of a first linear phase for applying a fractional sample shift in range frequency to said equalized sequence to obtain a shifted sequence;

a range FFT and Along Track IFFT of said shifted sequence to obtain a domain changed sequence;

a summing of a second linear phase to said domain changed sequence;

a CT FFT of said domain changed sequence to obtain an image of said patch.

7. A method as described in claim 6 wherein said azimuth interpolation and said range interpolation also include a Stolt interpolation after a matched filter function.

8. A method as described in claim 7 wherein said range compression is performed using an inverse Fast Fourier Transform.

9. A method as described in claim 8 wherein said image of said patch is further processed using spatially variant apodization.

10. A method as described in claim 9 wherein said compressed sequence is converted to a matrix and transposed.

* * * * *